C. E. MATTESON & C. W. BAILEY.
DIRIGIBLE HEADLIGHT.
APPLICATION FILED FEB. 16, 1918.

1,300,753.

Patented Apr. 15, 1919.
2 SHEETS—SHEET 1.

Inventors
C. E. Matteson
C. W. Bailey

C. E. MATTESON & C. W. BAILEY.
DIRIGIBLE HEADLIGHT.
APPLICATION FILED FEB. 16, 1918.
1,300,753.
Patented Apr. 15, 1919.
2 SHEETS—SHEET 2.
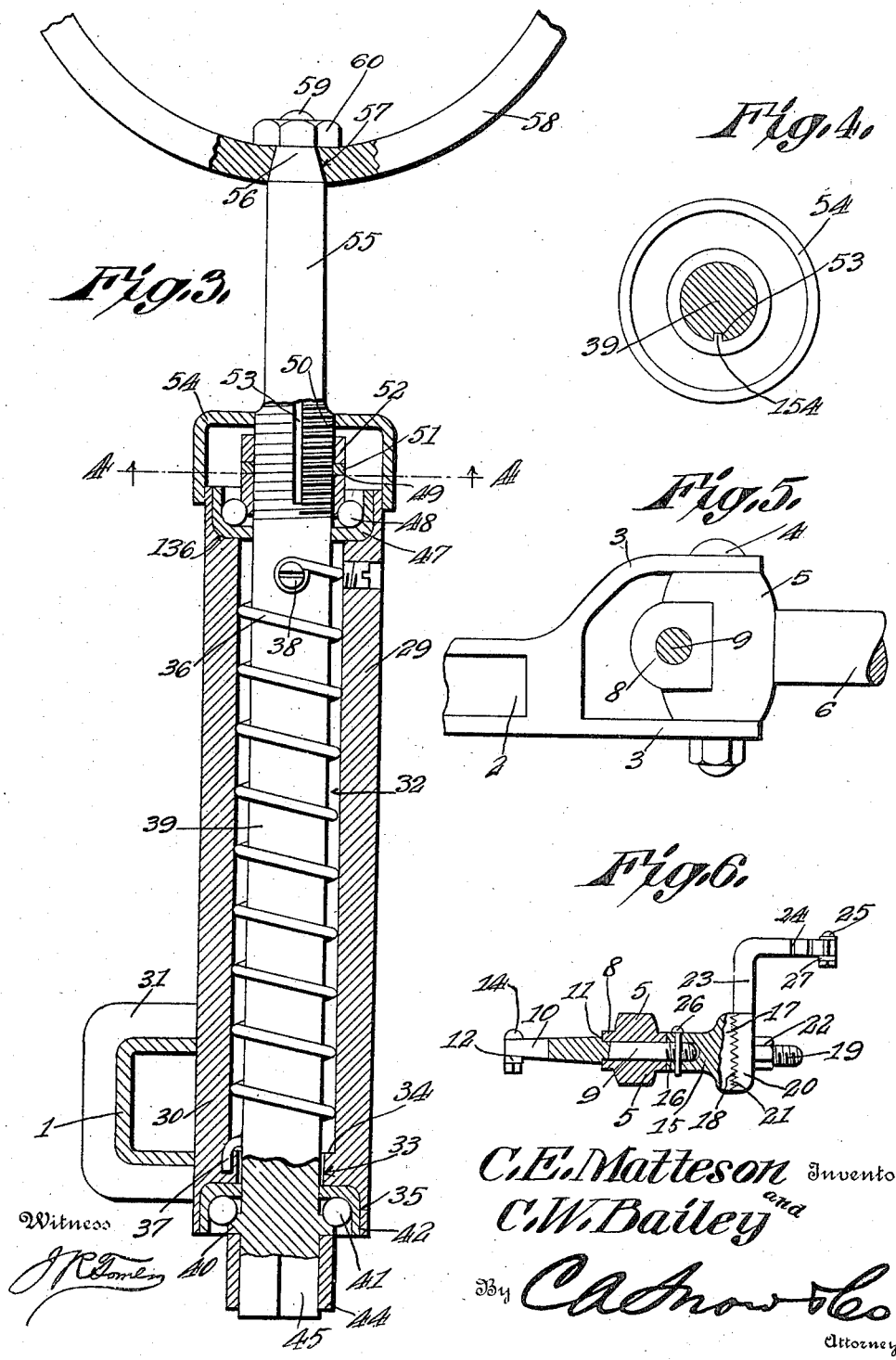

UNITED STATES PATENT OFFICE.

CHARLES E. MATTESON AND CHARLES W. BAILEY, OF MAUD, OKLAHOMA.

DIRIGIBLE HEADLIGHT.

1,300,753.   Specification of Letters Patent.   Patented Apr. 15, 1919.

Application filed February 16, 1918. Serial No. 217,724.

*To all whom it may concern:*

Be it known that we, CHARLES E. MATTESON and CHARLES W. BAILEY, citizens of the United States, residing at Maud, in the county of Pottawatomie, State of Oklahoma, have invented a new and useful Dirigible Headlight, of which the following is a specification.

It is the object of this invention to provide novel means whereby the lamps on an automobile may be turned automatically, to indicate the direction in which the automobile is about to proceed.

The invention aims to provide novel means for mounting the lamp carrying shaft for rotation, to provide novel means for actuating the lamp carrying shaft, and to provide novel means whereby the actuating mechanism for the lamp may be connected with the steering knuckle of a vehicle.

It is within the province of the disclosure to improve generally and to enhance the utility of devices of that type to which the present invention appertains.

With the above and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings:—

Fig. 3 is a longitudinal or vertical sectional view illustrating the mounting of the shaft which carries the lamp, parts appearing in section, and parts being broken away;

Fig. 4 is a cross section on the line 4—4 of Fig. 3, looking upwardly in the direction of the arrows, distant parts being omitted;

Fig. 5 is a fragmental elevation showing the mounting of the movable axle end on the main axle; and Fig. 6 is a section taken approximately on the line 6—6 of Fig. 1.

Figure 1:
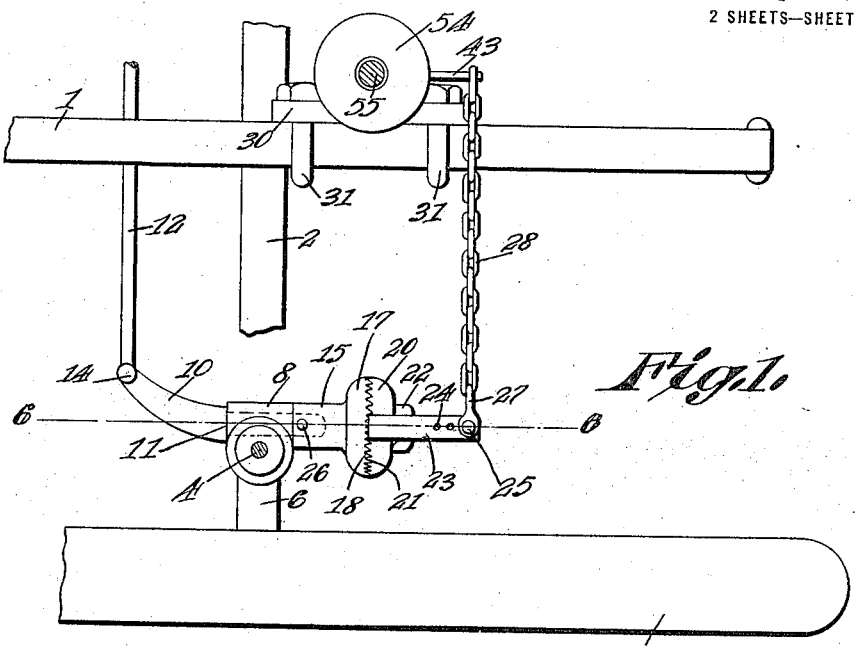
Figure 1 shows in top plan, a portion of a motor propelled vehicle whereunto the device forming the subject matter of this application has been applied, parts being broken away.
Figure 2:
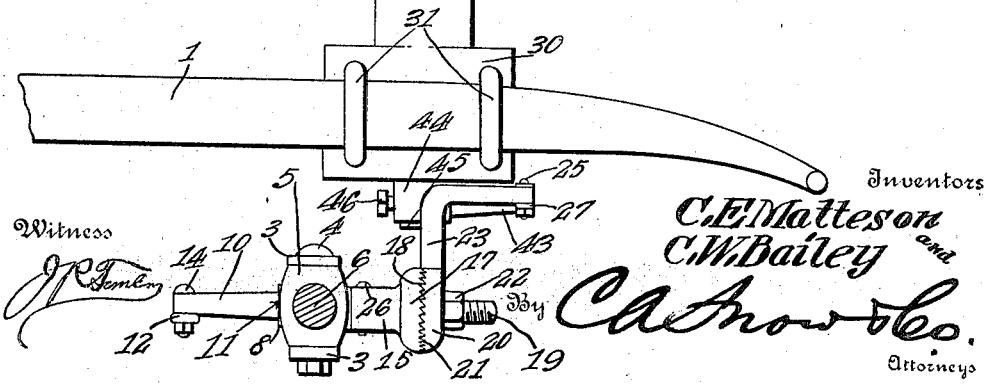
Fig. 2 is a fragmental side elevation, showing a portion of a motor propelled vehicle wherewith the device hereinafter described has been assembled, parts being broken away and parts appearing in section.

The device forming the subject matter of this application includes two structures whereby the lamps at the respective sides of the vehicle may be operated. These structures are duplicates, saving for a minor difference to be mentioned hereinafter, and but one of the said structures is shown in the drawings.

The numeral 1 denotes the chassis bar of a motor propelled vehicle. The axle is shown at 2 and has forks 3 receiving a pivot element 4 on which a sleeve 5 is mounted to rotate about a vertical axis. The sleeve 5 has an outwardly projecting axle end 6 on which a ground wheel 7 is journaled. The sleeve 5 is provided with a laterally extended lug 8 having flat forward and rear faces. Through the lug 8 passes a stem 9 constituting a part of a rearwardly extended arm 10 having a shoulder 11 which abuts against the rear end face of the lug 8. One end of a steering rod 12 is pivoted at 14 to the arm 10, the other end of the steering rod being pivoted to a like arm at the other side of the vehicle.

The numeral 15 denotes a neck constituting a part of a disk-like head 17. The neck 15 is threaded at 16 upon the end of the stem 9 and coacts with the lug 8 to hold the arm 10 in place on the sleeve 5. In order to prevent the neck 15 of the head 17 from turning on the stem 9, a pin 26 may be passed removably through these parts. The forward face of the head 17 is provided with radial teeth 18. The head 17 has a threaded spindle 19 projecting through a head 20 having radial teeth 21 coöperating with the teeth 18 of the head 17. A nut 22 is threaded upon the spindle 19 and holds the head 20 in place. The spindle 19 is of considerable length, so that, if desired, speedometer connections and the like (not shown) may be carried by the spindle 19 between the nut 22 and the head 20. The head 20 includes an upstanding angular arm 23, the forward end of which is provided with openings 24, in any one of which may be mounted for adjustment, a pivot element 25 carrying a clevis 27 with which is connected an inwardly extended flexible element, such as a chain 28.

The numeral 29 marks an upright tubular bearing having a side plate 30 attached by means of U-bolts 31 to the chassis bar 1. The bearing 29 has a large bore 32 and a small bore 33, the latter being located adjacent the lower end of the bearing and coöperating with the large bore 32 to form a shoulder 34. An enlarged recess 35 is fashioned in the lower end of the bearing 29. In the upper end of the bearing 29 there is formed an enlarged recess 136. A helical spring 37 is located in the large bore 32 of the bearing 29, the lower end of the spring being engaged, as shown at 37, with the shoulder 34 in the bearing 29, the shoulder serving as a support and as a place of connection for the lower end of the spring 36. The upper end of the spring 36 is connected by means of a screw 38 or otherwise with a shaft 39 journaled for rotation in the bearing 29 and lying within the spring 36. At this point it may be noted that the only distinguishing characteristic of the structures located at the opposite sides of the vehicle is that the springs 36 at the respective sides of the vehicle are wound in opposite directions, the functions of these springs being to rotate the shaft 39 and to turn the lamps which are carried by the shafts.

Adjacent its lower ends the shaft 39 is provided with an integral collar 40 supporting lower balls 41 coöperating with a ball race 42 seated in the recess 35. The numeral 43 denotes an arm, the free end of which is connected with the flexible element or chain 28. The other end of the arm 43 is provided with a collar 44 held in any suitable way on the lower end of the shaft 39, against rotation. In the present instance, the lower end of the shaft 39 is squared as shown at 45, the collar 44 being held on the squared end of the shaft by means of a set screw 46.

A ball race 37 is seated in the enlarged recess 136 at the upper end of the bearing 29 and supports upper balls 48 coöperating with a collar 49 mounted on a threaded part 50 of the shaft 39. A washer 51 surrounds the shaft above the collar 49 and rests thereon. A nut 52 is mounted on the threaded part 50 of the shaft 39 and coöperates with the washer 51. The shaft 39 has a key way 53 engaged by a projection 54 on the washer 51, the washer being held, in this way, against rotation, but for movement longitudinally of the shaft 39, under the action of the nut 52. A cup shaped dust cap 54 is mounted on the threaded part 50 of the shaft 39 and houses the upper end of the bearing 29. The shaft 39 projects through the dust cap 54 and is provided, above the dust cap, with a reduced stem 55 having a tapered portion 56 received in a correspondingly shaped opening 57 fashioned in a lamp fork 58, the part 56 of the shaft having a reduced end 59 on which is threaded a nut 60 coöperating with the lamp fork 58 to hold the same in place on the shaft 39 for rotation therewith.

In practical operation, when the arm 10 is swung by means of the steering rod 12, to operate the axle end 6 by means of the pivotally mounted sleeve 5, and to shift the wheel 7, the neck 15 and the head 17, along with the angular arm 23, are swung laterally, the flexible element 28 being moved longitudinally, and rotation being imparted to the shaft 39 by means of the arm 43, the flexible element 28 serving to rotate the shaft 39, and consequently the fork 58 in one direction, and the spring 36 serving to rotate the shaft 39 in an opposite direction, thereby to restore the lamp (not shown) on the fork 58 to its original position. From the foregoing, it will be observed that a simple means is provided whereby, automatically, the lamps on a motor propelled vehicle, will be turned to correspond with the direction in which the vehicle is proceeding.

The neck 15 of the head 17 constitutes a nut which, coacting with the stem 9 serves to hold the arm 10 on the sleeve 5. By loosening the nut 22, the arm 23 may be adjusted transversely of the direction in which the vehicle is proceeding, thereby to regulate the tension in the chain 28. When the nut 22 is tightened up, the teeth 21 on the head 20, coöperating with the teeth 18 of the head 17, prevent relative rotation between the head 20 and the head 17.

The nut 52 may be advanced on the threaded part 50 of the shaft 39, thereby moving the washer 51 downwardly, so that the latter holds the collar 49 in place on the balls 48, the projection 54 on the washer 51 coacting with the key way 53, to prevent the rotation of the washer, as hereinbefore set forth.

The nut 60 may be loosened, the lamp fork 58 being turned on the tapered part 56 of the shaft 39, so that the fork and the lamp (not shown) thereon may be regulated with respect to the direction in which the vehicle proceeds, it being possible to hold the lamp fork firmly on the tapered part 56 of the shaft 39 by tightening down the nut 60.

Having thus described the invention, what is claimed is:—

1. The combination with a vehicle frame and a movable axle end, of a stem passing through the axle end and provided with a shoulder engaging one side of the axle end; a head having teeth, a spindle, and a neck mounted on the stem and engaging the opposite side of the axle end; an arm including a head rotatably adjustable on the spindle and having teeth coöperating with the teeth of the first specified head; means on the spindle and coöperating with the head of the arm to hold the teeth of the heads interengaged; a lamp shaft journaled in the frame; an operative connection between the shaft and the arm; and operating means connected with the stem.

2. In a device of the class described, an axle; a sleeve mounted to swing on the axle; a movable wheel carrying axle end constituting a part of the sleeve; a steering arm extended through the sleeve; a steering rod connected with one end of the steering arm; a head carried by the other end of the steering arm and coacting with the sleeve; a second arm; means for securing the second arm to the head to permit a swinging movement of the second arm transversely of the line of advance of the vehicle; a lamp shaft journaled on the vehicle; and a flexible connection between the lamp shaft and the second arm.

In testimony that we claim the foregoing as our own, we have hereto affixed our signatures in the presence of two witnesses.

CHARLES E. MATTESON.
CHARLES W. BAILEY.

Witnesses:
F. L. PRYOR,
B. B. JOHNSON.

Copies of this patent may be obtained for five cents each, by addressing the "Commissioner of Patents, Washington, D. C."